United States Patent
Chowdhury et al.

(10) Patent No.: US 12,436,988 B2
(45) Date of Patent: Oct. 7, 2025

(54) KEYPHRASE GENERATION

(71) Applicant: International Business Machines Corporation, Armonk, NY (US)

(72) Inventors: Md Faisal Mahbub Chowdhury, Woodside, NY (US); Alfio Massimiliano Gliozzo, Brooklyn, NY (US); Gaetano Rossiello, Brooklyn, NY (US); Michael Robert Glass, Bayonne, NJ (US); Nandana Sampath Mihindukulasooriya, Dublin (IE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 106 days.

(21) Appl. No.: 17/986,117

(22) Filed: Nov. 14, 2022

(65) Prior Publication Data

US 2024/0160653 A1    May 16, 2024

(51) Int. Cl.
*G06F 16/00* (2019.01)
*G06F 16/31* (2019.01)
*G06F 16/353* (2025.01)

(52) U.S. Cl.
CPC .......... *G06F 16/353* (2019.01); *G06F 16/313* (2019.01)

(58) Field of Classification Search
None
See application file for complete search history.

(56) References Cited

U.S. PATENT DOCUMENTS

| | | |
|---|---|---|
| 9,171,267 B2 | 10/2015 | Ocke et al. |
| 9,342,590 B2 | 5/2016 | Karidi et al. |
| 9,990,368 B2 | 6/2018 | Walid et al. |
| 10,402,061 B2 | 9/2019 | Kohlmeier et al. |
| 10,628,496 B2 | 4/2020 | Babu et al. |
| 10,885,275 B2 | 1/2021 | Gee et al. |
| 10,936,630 B2 | 3/2021 | Ronen et al. |
| 11,030,394 B1 | 6/2021 | Kozareva et al. |
| 11,093,687 B2 | 8/2021 | Kesin et al. |
| 11,537,950 B2 | 12/2022 | Bui et al. |
| 12,072,841 B2 | 8/2024 | Rossiello et al. |

(Continued)

FOREIGN PATENT DOCUMENTS

| | | |
|---|---|---|
| CN | 102591920 B | 11/2013 |
| CN | 107832418 A | 3/2018 |
| CN | 108459874 B | 3/2021 |

OTHER PUBLICATIONS

Chowdhury, et al., "Applying a Generic Sequence-to-Sequence Model for Simple and Effective Keyphrase Generation", Jan. 14, 2022.

(Continued)

*Primary Examiner* — Tony Mahmoudi
*Assistant Examiner* — Suman Rajaputra
(74) *Attorney, Agent, or Firm* — Garg Law Firm, PLLC; Rakesh Garg; Kristofer Haggerty

(57) ABSTRACT

Using a trained keyphrase generation model, a set of keyphrases corresponding to an input document is generated, a keyphrase in the set of keyphrases comprising a word summarizing a portion of a document. A relevance score measuring a similarity between the keyphrase and the document is calculated for a keyphrase in the set of keyphrases. The relevance score is adjusted according to a diversity balancing function.

20 Claims, 5 Drawing Sheets

(56) References Cited

U.S. PATENT DOCUMENTS

| | | | |
|---|---|---|---|
| 2013/0246386 A1* | 9/2013 | Gherman | G06F 16/951 707/750 |
| 2015/0261773 A1 | 9/2015 | Walid et al. | |
| 2015/0381526 A1* | 12/2015 | Beaty | H04L 67/51 709/226 |
| 2017/0164011 A1* | 6/2017 | Rimon | G06F 16/353 |
| 2017/0364586 A1* | 12/2017 | Krishnamurthy | G06F 16/3329 |
| 2018/0046763 A1 | 2/2018 | Price, Jr. et al. | |
| 2019/0155944 A1 | 5/2019 | Mahata et al. | |
| 2020/0207087 A1 | 7/2020 | Tanaka et al. | |
| 2021/0004439 A1 | 1/2021 | Xiong et al. | |
| 2021/0109959 A1 | 4/2021 | Boni et al. | |
| 2021/0134173 A1 | 5/2021 | Yuan et al. | |
| 2021/0151038 A1 | 5/2021 | Manjunath et al. | |
| 2021/0182490 A1* | 6/2021 | Guo | G06F 40/284 |
| 2021/0240939 A1 | 8/2021 | Walters et al. | |
| 2021/0326636 A1 | 10/2021 | Mihindukulasooriya et al. | |
| 2021/0406444 A1 | 12/2021 | Vontobel et al. | |
| 2022/0004712 A1* | 1/2022 | Bahuleyan | G06N 3/048 |
| 2022/0114476 A1 | 4/2022 | Bui et al. | |
| 2022/0253604 A1 | 8/2022 | Yang et al. | |
| 2022/0261545 A1* | 8/2022 | Lauber | G06F 40/216 |
| 2022/0374600 A1 | 11/2022 | Cheng et al. | |
| 2023/0091076 A1 | 3/2023 | Yang et al. | |
| 2023/0282018 A1 | 9/2023 | Basu et al. | |

OTHER PUBLICATIONS

Boudin et al., Redefining Absent Keyphrases and Their Effect on Retrieval Effectiveness, Proceedings of the 2021 Conference of the North American Chapter of the Association for Computational Linguistics: Human Language Technologies, pp. 4185-4193, Jun. 6-11, 2021.

Ye et al., ONE2SET: Generating Diverse Keyphrases as a Set, Proceedings of the 59th Annual Meeting of the Association for Computational Linguistics and the 11th International Joint Conference on Natural Language Processing, pp. 4598-4608, Aug. 1-6, 2021.

Zhang et al., Keyphrase Generation Based on Deep Seq2seq Model, IEEE Access, vol. 6, pp. 46047-46057, Aug. 16, 2018.

Park et al., KPDROP:An Approach to Improving Absent Keyphrase Generation, Cornell University Library, pp. 1-9, Dec. 8, 2021.

Ahmad et al., Select, Extract and Generate: Neural Keyphrase Generation With Layer-Wise Coverage Attention, Cornell University Library, pp. 1-16, Jun. 4, 2021.

Meng et al., An Empirical Study on Neural Keyphrase Generation, School of Computing and Information, University of Pittsburgh, Apr. 15, 2021.

Swaminathan et al., A Preliminary Exploration of GANs for Keyphrase Generation, Proceedings of the 2020 Conference on Empirical Methods in Natural Language Processing, pp. 8021-8030, Nov. 16-20, 2020.

Luo et al., SenSeNet: Neural Keyphrase Generation with Document Structure, Shanghai Key Laboratory of Intelligent Information Processing, Dec. 12, 2020.

Gallina et al., KPTimes: A Large-Scale Dataset for Keyphrase Generation on News Documents, Nov. 28, 2019.

Boudin et al., Keyphrase Generation for Scientific Document Retrieval, Proceedings of the 58th Annual Meeting of the Association for Computational Linguistics, pp. 1118-1126, Jul. 5-10, 2020.

Cano et al., Keyphrase Generation: A Multi-Aspect Survey, 2019 25th Conference of Open Innovations Association (FRUCT), Oct. 11, 2019.

Shen et al., Unsupervised Deep Keyphrase Generation, Apr. 18, 2021.

Yuan et al., One Size Does Not Fit All: Generating and Evaluating Variable Number of Keyphrases, May 12, 2020.

Chen et al., Exclusive Hierarchical Decoding for Deep Keyphrase Generation, Apr. 18, 2020.

Lewis et al., BART: Denoising Sequence-to-Sequence Pre-training for Natural Language Generation, Translation, and Comprehension, Oct. 29, 2019.

Bennani-Smires et al., Simple Unsupervised Keyphrase Extraction using Sentence Embeddings, Sep. 5, 2018.

Sun et al., Breaking Cycles in Noisy Hierarchies, WebSci'17, Jun. 25-28, 2017.

Bennani-Smires et al., EmbedRank: Unsupervised Keyphrase Extraction using Sentence Embeddings, Feb. 19, 2018.

List of all IBM related dockets, 2022.

"Datasets: memray/stackexchange", Hugging Face, https://huggingface.co/datasets/memray/stackexchange, retrieved from the internet- Feb. 25, 2025, 2 pages.

Cer et al., "Universal Sentence Encoder for English", Proceedings of the 2018 Conference on Empirical Methods in Natural Language Processing (System Demonstrations), October 31-Nov. 4, 2018, pp. 169-174.

Chiu et al., "Autoencoding Keyword Correlation Graph for Document Clustering", Proceedings of the 58th Annual Meeting of the Association for Computational Linguistics, Jul. 5-10, 2020, pp. 3974-3981.

Glass et al., "Dynamic Facet Selection by Maximizing Graded Relevance", Proceedings of the First Workshop on Interactive Learning for Natural Language Processing, Aug. 5, 2021, pp. 32-39.

Goldstein et al., "Summarization: (1) using MMR for diversity - based reranking and (2) evaluating summaries", TIPSTER '98: Proceedings of a workshop on held at Baltimore, Oct. 13-15, 1998, pp. 181-195.

Pagliardini et al., "Unsupervised Learning of Sentence Embeddings using Compositional n-Gram Features", Proceedings of NAACL-HLT 2018, 2018, pp. 528-540.

* cited by examiner

KEYPHRASE GENERATION

BACKGROUND

The present invention relates generally to a method, system, and computer program product for natural language processing. More particularly, the present invention relates to a method, system, and computer program product for keyphrase generation.

A keyphrase is a set of one or more words that summarize a portion of a document. For example, some keyphrases corresponding to the Wikipedia article on cats might be "domestic species of small carnivorous mammal", "evolution", "cat vision", and "interaction with humans". (Wikipedia is a registered trademark of Wikimedia Foundation, Inc. in the United States and other countries.) A keyphrase need not include any particular number of words. Keyphrases have many applications in natural language processing, including aiding document browsing by providing a document summary, improving the accuracy of information retrieval by searching for keyphrases instead of a full-text search), document clustering into topics and other groups, and generating index entries for a document such as a book. Present keyphrases are those which are present in the document being summarized. Absent keyphrases are those which are not present in, but can be inferred from, the document being summarized. If a text summarizer or concept extractor can only generate present keyphrases, the summarizer will be unable to link a portion of an input text to a concept not explicitly mentioned in the text. One goal of a summarizer is to generate keyphrases that are both central (i.e., contain the main ideas in a document) and diverse (i.e., are different from one another). Present keyphrases are often syntactically and semantically very similar to each other, and inclusion of absent keyphrases helps to improve keyphrase diversity by describing different features of a document.

SUMMARY

The illustrative embodiments provide a method, system, and computer program product. An embodiment includes a method that generates, using a trained keyphrase generation model, a set of keyphrases corresponding to an input document, a keyphrase in the set of keyphrases comprising a word summarizing a portion of a document. An embodiment calculates, for a keyphrase in the set of keyphrases, a relevance score, the relevance score measuring a similarity between the keyphrase and the document. An embodiment adjusts, according to a diversity balancing function, the relevance score, the adjusting resulting in an adjusted relevance score.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
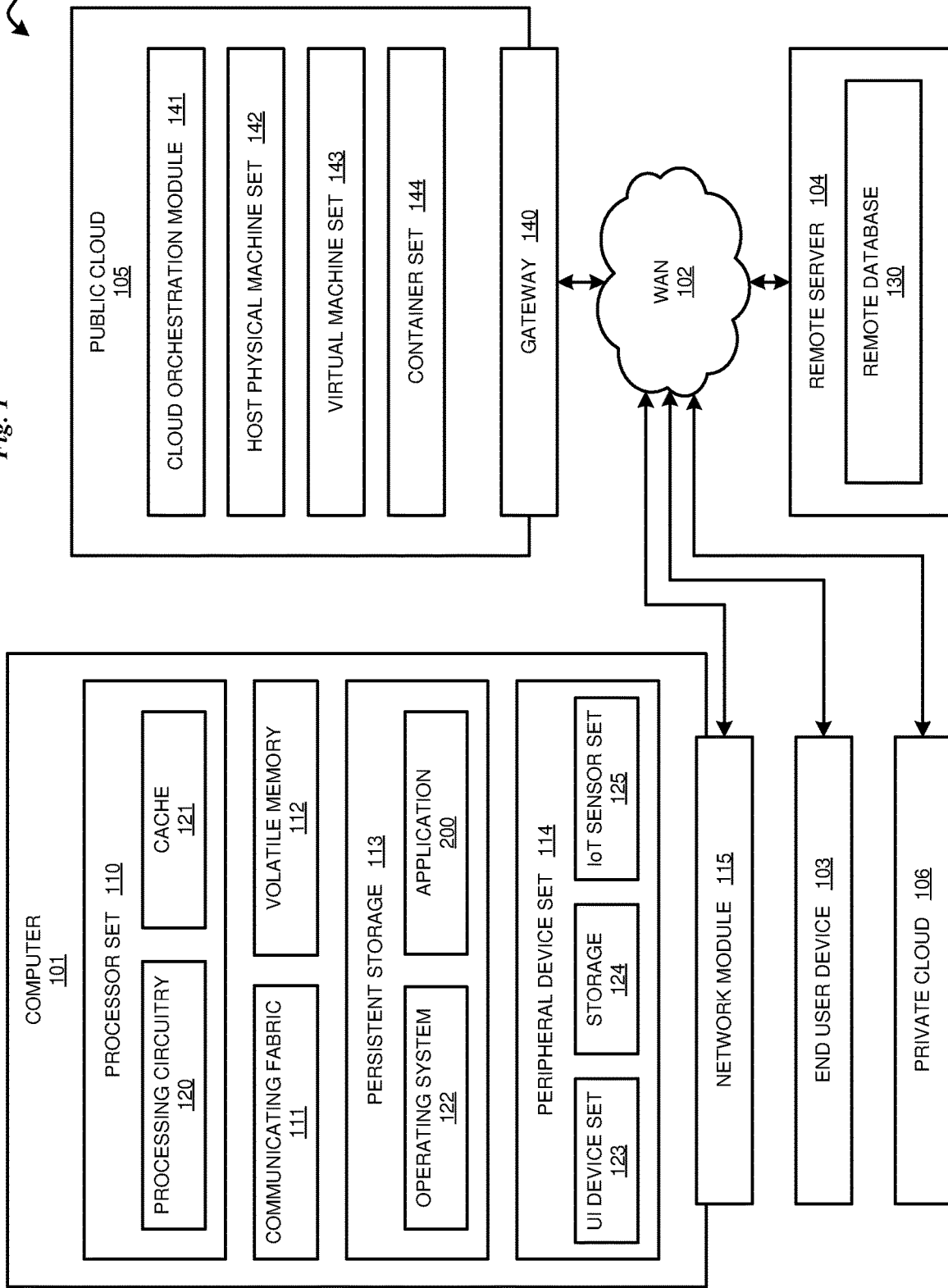
FIG. 1 depicts an example diagram of a data processing environments in which illustrative embodiments may be implemented.

The illustrative embodiments recognize that existing keyphrase generation approaches, particularly for absent keyphrases, lack sufficient diversity. Existing keyphrase generation approaches generate keyphrases, one at time, without referencing the keyphrases that have already been generated and thus failing to model similarities among generated phrases. Existing keyphrase generation approaches also do not take diversity into account when evaluating generated keyphrases for eventual use. Consequently, these approaches often result in output that is duplicative and lacks sufficient diversity. Thus, the illustrative embodiments recognize that there is a need to improve keyphrase diversity.

The illustrative embodiments recognize that the presently available tools or solutions do not address these needs or provide adequate solutions for these needs. The illustrative embodiments used to describe the invention generally address and solve the above-described problems and other problems related to keyphrase generation.

An embodiment can be implemented as a software application. The application implementing an embodiment can be configured as a modification of an existing document analysis system, as a separate application that operates in conjunction with an existing document analysis system, a standalone application, or some combination thereof.

Particularly, some illustrative embodiments provide a method that generates, using a trained keyphrase generation model, a set of keyphrases corresponding to an input document, calculates a relevance score for a keyphrase in the set of keyphrases, and adjusts the relevance score according to a diversity balancing function.

An embodiment automatically generates training data for use in training a keyphrase generation model to generate keyphrases. The generated training data includes a document or portion of a document and one or more keyphrases describing the document or portion. As input to the training data generation, an embodiment receives a training document and a set of one or more categories the training document has already been classified into. For example, the training document might be an article from Wikipedia and the categories might be those assigned to the document by a Wikipedia editor.

An embodiment removes any categories from the set of categories that do not comprise text included in the document, so that the remaining categories are all present in the document. For example, if the training document is an article from Wikipedia about cats and one of the categories is tiger but the string "tiger" is not present in the article, an embodiment removes the tiger category from the set of categories. One embodiment removes a category with a category frequency outside a range between a higher threshold and a lower threshold from the set of categories. A category frequency is the number of distinct pages that are annotated with or assigned to the given category. The most-used categories are likely to be too generic, and the least-used categories are likely to be too specific, to be useful as keyphrases describing a specific document.

If more than a threshold number of categories remain in the set of categories after the removing, an embodiment divides the training document into a plurality of portions. If a category is present the text of a portion, an embodiment labels the portion with the category, used as a keyphrase. For example, if the training document is an article from Wikipedia about cats, one of the remaining categories is "domestic cat", and the string "domestic cat" is present in the text of a portion, an embodiment labels the portion with the keyphrase "domestic cat". If at least a portion of a category is present in the text of a portion, another embodiment labels the portion with the category as a keyphrase. Using at least a portion of a category compensates for different parts of speech and spelling variations that may be present in a portion of the training document.

An embodiment uses the generated training data to train a keyphrase generation model. Techniques for training a keyphrase generation model are presently available.

An embodiment uses a trained keyphrase generation model to generate a set of keyphrases corresponding to an input document. In one embodiment, the trained keyphrase generation model is a sequence-to-sequence model. A sequence-to-sequence model is a presently available technique that converts one sequence into another sequence. One version of a sequence-to-sequence model is implemented using an encoder network that converts each input item into a numerical representation representing the input item and its context, followed by a decoder network that turns the numerical representation into an output item, using the previous output as a context. Another version of a sequence-to-sequence model omits the encoder network. Another version of a sequence-to-sequence model produces a set of highest-ranked or most probable output items instead of just one.

In one embodiment, the input sequence to the model is a sequence of words or other portions of an input document for which a keyphrase is to be generated, and the output sequence is one or more keyphrases corresponding to the input sequence. In this embodiment, keyphrases are generated independently from each other, without referencing previously generated keyphrases for the same document. In another embodiment, a previously generated keyphrase is used as an additional input to the model, following the input document in the input sequence, so that a subsequent keyphrase is generated referencing a previously generated keyphrase for the same document. In another embodiment, a set of previously generated keyphrases is used as additional inputs to the model, following the input document in the input sequence, so that a subsequent keyphrase is generated referencing a set of previously generated keyphrases for the same document.

An embodiment calculates a relevance score for one or more keyphrases in the set of generated keyphrases. A relevance score measures a similarity between the keyphrase and the document. One embodiment uses a trained contextual embedding model, a presently available technique, to generate embeddings corresponding to the one or more keyphrase and to the input document. An embedding is a numerical representation of an item, typically in the form of a real-valued vector that encodes an input item such that embeddings that are closer in the vector space correspond to inputs that are correspondingly similar to each other. As a result, similarity between two inputs (e.g., between a keyphrase and a document) can be measured by calculating a similarity between embeddings representing the two inputs. One presently available similarity calculation technique is cosine similarity, which measures an angle between two vectors (or embeddings). The smaller the angle, the greater the similarity.

An embodiment adjusts a relevance score for one or more keyphrases in the set of generated keyphrases, using a diversity balancing function. A diversity balancing function uses diversity among keyphrases to adjust the keyphrases' relevance scores, reducing the number of keyphrases in a set that are very similar to each other (and thus redundant) in favor including some diverse keyphrases.

One embodiment combines adjusting a relevance score for one or more keyphrases and ranking the set of keyphrases according to the adjusted relevance score corresponding to each keyphrase, using Maximal Marginal Relevance (MMR), a presently available technique. In particular, for an embedding of keyphrase $C_i$ in the set of keyphrases, an embodiment selects the embedding of keyphrase $C_j$ for which $\lambda * \cos_{sim}(C_i, doc) - (1-\lambda) * \max(\cos_{sim}(C_i, C_j))$ is a maximum. In the expression, $\lambda$ is a predefined parameter between 0 and 1 that implements a tradeoff between relevance and diversity. The higher $\lambda$ is, the more relevant (i.e., less diverse) the selected keyphrases will be. In the expression, $\cos_{sim}(C_i, doc)$ denotes a normalized cosine similarity between embeddings of keyphrase $C_i$ and the input document, and $\max(\cos_{sim}(C_i, C_j))$ denotes the maximum normalized cosine similarity between embeddings of two keyphrases $C_i$ and $C_j$. The embeddings for the keyphrases and the input document are generated from a language independent embedding model (e.g., a universal sentence encoder). A language independent embedding model generates embeddings that are not specific to a particular human language such as English. The result is a ranked list of keyphrases that takes relevance and diversity into account.

Another embodiment adjusts a relevance score for one or more keyphrases by maximizing expected Discounted Cumulative Gain (DCG), a presently available measure of ranking quality that uses a graded relevance scale. Intuitively, the goal is to optimize DCG in expectation by providing keyphrases that produce different and likely rankings for the passages (i.e., portions) of an input document from which the keyphrases were generated.

Another embodiment adjusts a relevance score for one or more keyphrases using a knowledge graph which includes information about the subject matter of the input document for which keyphrases are being generated and scored. Nodes in the knowledge graph represent concepts, and edges connecting nodes in the knowledge graph represent relationships between concepts. One embodiment uses a presently available entity linking technique (e.g., BLINK or the Radboud Entity Linker) to assign an entity in the knowledge graph to a keyphrase. Another embodiment uses a Siamese neural network, a presently available artificial neural network technique that uses the same weights while working in tandem on two different input vectors to compute comparable output vectors. In particular, one side of the network produces an output vector from a keyphrase-input document pair, while the other side of the network produces an output vector from an entity and textual description of the entity, and uses a similarity measure between the two outputs to assign an entity to each keyphrase. An embodiment uses a presently available technique (e.g., generating the shortest paths between entities in a graph using the presently available NetworkX library) to generate a minimal fully connected sub-graph containing the entities with keyphrases assigned. An embodiment uses a presently available technique to create clusters of the sub-graph, with each cluster having at least one entity with a keyphrase assigned. An embodiment adjusts relevance scores of the clustered keyphrases so as to include the keyphrase with the highest relevance score in a cluster in a final grouping of keyphrases with highest relevance scores.

An embodiment ranks the set of keyphrases according to the adjusted relevance score corresponding to each keyphrase. An embodiment selects, as an output set of keyphrases corresponding to the input document, a predetermined number of the highest-ranked keyphrases. Another embodiment selects, as an output set of keyphrases corresponding to the input document, a predetermined number of the highest-ranked keyphrases that also have adjusted relevance scores above a threshold score.

The manner of keyphrase generation described herein is unavailable in the presently available methods in the technological field of endeavor pertaining to document analysis. A method of an embodiment described herein, when implemented to execute on a device or data processing system, comprises substantial advancement of the functionality of that device or data processing system in generating, using a trained keyphrase generation model, a set of keyphrases corresponding to an input document, calculating a relevance score for a keyphrase in the set of keyphrases, and adjusting the relevance score according to a diversity balancing function.

The illustrative embodiments are described with respect to certain types of keyphrases, documents, portions, entities, training data, keyphrase generation models, thresholds, rankings, adjustments, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to the figures and in particular with reference to FIG. 1, this figure is an example diagram of a data processing environments in which illustrative embodiments may be implemented. FIG. 1 is only an example and are not intended to assert or imply any limitation with regard to the environments in which different embodiments may be implemented. A particular implementation may make many modifications to the depicted environments based on the following description. FIG. 1 depicts a block diagram of a network of data processing systems in which illustrative embodiments may be implemented. Computing environment 100 contains an example of an environment for the execution of at least some of the computer code involved in performing the inventive methods, such as application 200. Application 200 implements a keyphrase generation embodiment described herein. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144. Application 200 executes in any of computer 101, end user device 103, remote server 104, or a computer in public cloud 105 or private cloud 106 unless expressly disambiguated.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processor set 110 may contain one or more processors and may be implemented using one or more heterogeneous processor systems. A processor in processor set 110 may be a single- or multi-core processor or a graphics processor. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Operating system 122 runs on computer 101. Operating system 122 coordinates and provides control of various components within computer 101. Instructions for operating system 122 are located on storage devices, such as persistent storage 113, and may be loaded into at least one of one or more memories, such as volatile memory 112, for execution by processor set 110.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods of application 200 may be stored in persistent storage 113 and may be loaded into at least one of one or more memories, such as volatile memory 112, for execution by processor set 110. The processes of the illustrative embodiments may be performed by processor set 110 using computer implemented instructions, which may be located in a memory, such as, for example, volatile memory 112, persistent storage 113, or in one or more peripheral devices in peripheral device set 114. Furthermore, in one case, application 200 may be downloaded over WAN 102 from remote server 104, where similar code is stored on a storage device. In another case, application 200 may be downloaded over WAN 102 to remote server 104, where downloaded code is stored on a storage device.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in application 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, user interface (UI) device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. Internet of Things (IoT) sensor set 125 is made up of sensors that can be used in IoT applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

Wide area network (WAN) 102 is any WAN (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
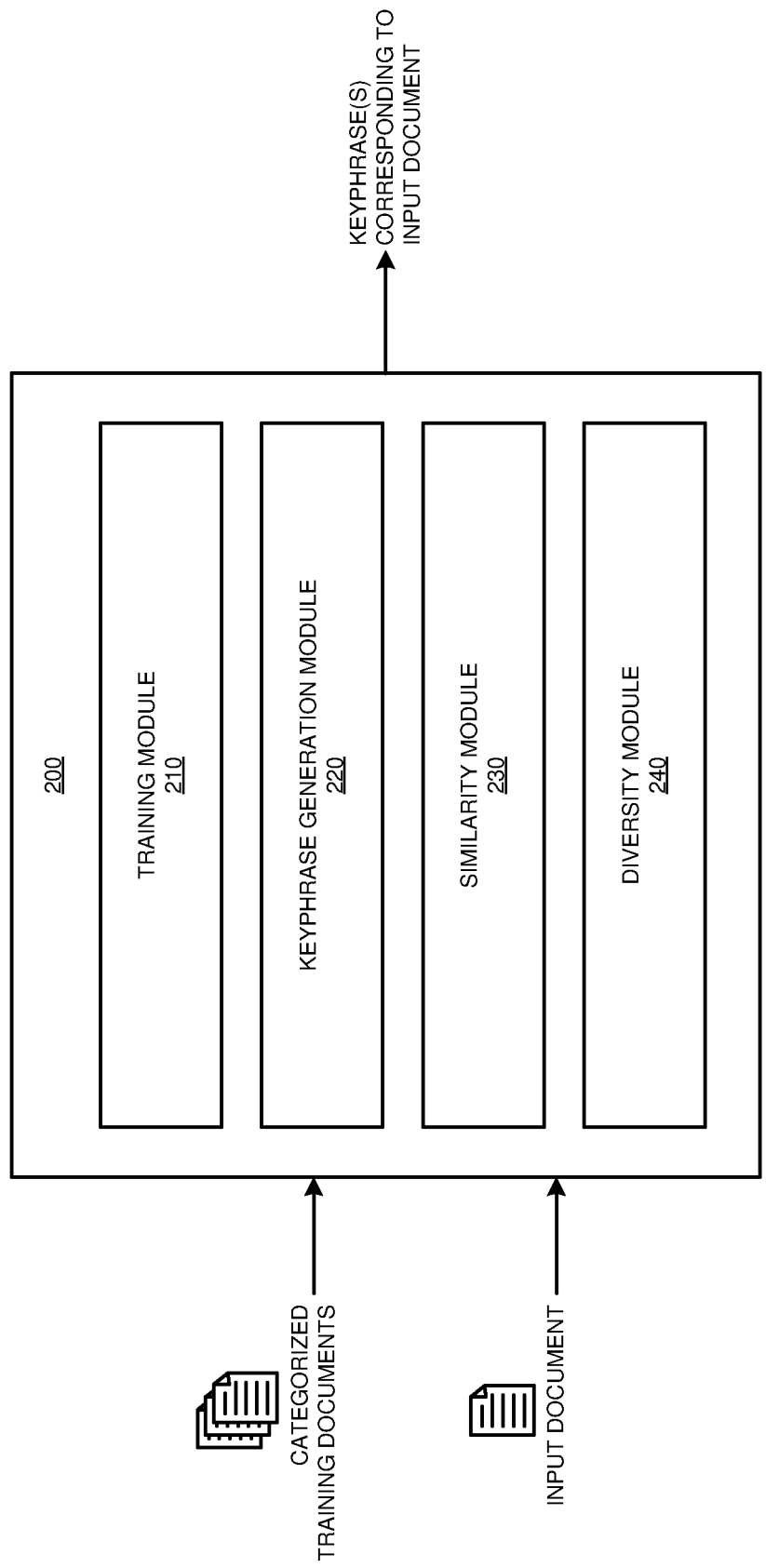
FIG. 2 depicts a block diagram of an example configuration for keyphrase generation in accordance with an illustrative embodiment.

With reference to FIG. 2, this figure depicts a block diagram of an example configuration for keyphrase generation in accordance with an illustrative embodiment. Application 200 is the same as application 200 in FIG. 1.

Training module 210 automatically generates training data for use in training a keyphrase generation model to generate keyphrases. The generated training data includes a document or portion of a document and one or more keyphrases describing the document or portion. As input to the training data generation, an embodiment receives a training document and a set of one or more categories the training document has already been classified into. For example, the training document might be an article from Wikipedia and the categories might be those assigned to the document by a Wikipedia editor.

Module 210 removes any categories from the set of categories that do not comprise text included in the document, so that the remaining categories are all present in the document. For example, if the training document is an article from Wikipedia about cats and one of the categories is tiger but the string "tiger" is not present in the article, module 210 removes the tiger category from the set of categories. One implementation of module 210 remove a category with a category frequency outside a range between a higher threshold and a lower threshold from the set of categories.

If more than a threshold number of categories remain in the set of categories after the removing, module 210 divides the training document into a plurality of portions. If a category is present the text of a portion, module 210 labels the portion with the category, used as a keyphrase. For example, if the training document is an article from Wikipedia about cats, one of the remaining categories is "domestic cat", and the string "domestic cat" is present in the text of a portion, module 210 labels the portion with the keyphrase "domestic cat". If at least a portion of a category is present the text of a portion, another implementation of module 210 labels the portion with the category, used as a keyphrase.

Module 210 uses the generated training data to train a keyphrase generation model.

Keyphrase generation module 220 uses a trained keyphrase generation model to generate a set of keyphrases corresponding to an input document. In one implementation of module 220, the trained keyphrase generation model is a sequence-to-sequence model. In one implementation of module 220, the input sequence to the model is a sequence of words or other portions of an input document for which a keyphrase is to be generated, and the output sequence is one or more keyphrases corresponding to the input sequence. In this implementation of module 220, keyphrases are generated independently from each other, without referencing previously generated keyphrases for the same document. In another implementation of module 220, a previously generated keyphrase is used as an additional input to the model, following the input document in the input sequence, so that a subsequent keyphrase is generated referencing a previously generated keyphrase for the same document. In another implementation of module 220, a set of previously generated keyphrases is used as additional inputs to the model, following the input document in the input sequence, so that a subsequent keyphrase is generated referencing a set of previously generated keyphrases for the same document.

Similarity module 230 calculates a relevance score for one or more keyphrases in the set of generated keyphrases. A relevance score measures a similarity between the keyphrase and the document. One implementation of module 230 uses a trained contextual embedding model to generate embeddings corresponding to the one or more keyphrase and to the input document, and calculates a relevance score between a keyphrase and a document by calculating a similarity between embeddings representing the two inputs.

Diversity module 240 adjusts a relevance score for one or more keyphrases in the set of generated keyphrases, using a diversity balancing function. A diversity balancing function uses diversity among keyphrases to adjust the keyphrases' relevance scores, reducing the number of keyphrases in a set that are very similar to each other (and thus redundant) in favor including some diverse keyphrases.

One implementation of module 240 combines adjusting a relevance score for one or more keyphrases and ranking the set of keyphrases according to the adjusted relevance score corresponding to each keyphrase, using Maximal Marginal Relevance (MMR), a presently available technique. In particular, for an embedding of keyphrase $C_i$ in the set of keyphrases, an embodiment selects the embedding of keyphrase $C_j$ for which $\lambda * \cos_{sim}(C_i, doc) - (1 - * \max(\cos_{sim}(C_i, C_j))$ is a maximum. In the expression, $\lambda$ is a predefined parameter between 0 and 1 that implements a tradeoff between relevance and diversity. The higher $\lambda$ is, the more relevant (i.e., less diverse) the selected keyphrases will be. In the expression, $\cos_{sim}(C_i, doc)$ denotes a normalized cosine similarity between embeddings of keyphrase $C_i$ and the input document, and $\max(\cos_{sim}(C_i, C_j))$ denotes the maximum normalized cosine similarity between embeddings of two keyphrases $C_i$ and $C_j$. The embeddings for the keyphrases and the input document are generated from a language independent embedding model (e.g., a universal sentence encoder). A language independent embedding model generates embeddings that are not specific to a particular human language such as English. The result is a ranked list of keyphrases that takes relevance and diversity into account.

Another implementation of module 240 adjusts a relevance score for one or more keyphrases by maximizing expected Discounted Cumulative Gain (DCG), a presently available measure of ranking quality that uses a graded relevance scale. Intuitively, the goal is to optimize DCG in expectation by providing keyphrases that produce different and likely rankings for the passages (i.e., portions) of an input document from which the keyphrases were generated.

Another implementation of module 240 adjusts a relevance score for one or more keyphrases using a knowledge graph which includes information about the subject matter of the input document for which keyphrases are being generated and scored. Nodes in the knowledge graph represent concepts, and edges connecting nodes in the knowledge graph represent relationships between concepts. One implementation of module 240 uses an entity linking technique to assign an entity in the knowledge graph to a keyphrase. Another implementation of module 240 uses a Siamese neural network, in which one side of the network produces an output vector from a keyphrase-input document pair, while the other side of the network produces an output vector from an entity and textual description of the entity, and uses a similarity measure between the two outputs to assign an entity to each keyphrase. Module 240 generates a minimal fully connected sub-graph containing the aligned entities with keyphrases assigned. Module 240 uses a presently available technique to create clusters of the sub-graph, with each cluster having at least one entity with a keyphrase assigned. Module 240 adjusts relevance scores of the clustered keyphrases so as to include the keyphrase with the highest relevance score in a cluster in a final grouping of keyphrases with highest relevance scores.

Module 240 ranks the set of keyphrases according to the adjusted relevance score corresponding to each keyphrase. Module 240 selects, as an output set of keyphrases corresponding to the input document, a predetermined number of the highest-ranked keyphrases. Another implementation of module 240 selects, as an output set of keyphrases corresponding to the input document, a predetermined number of the highest-ranked keyphrases that also have adjusted relevance scores above a threshold score.

Figure 3:
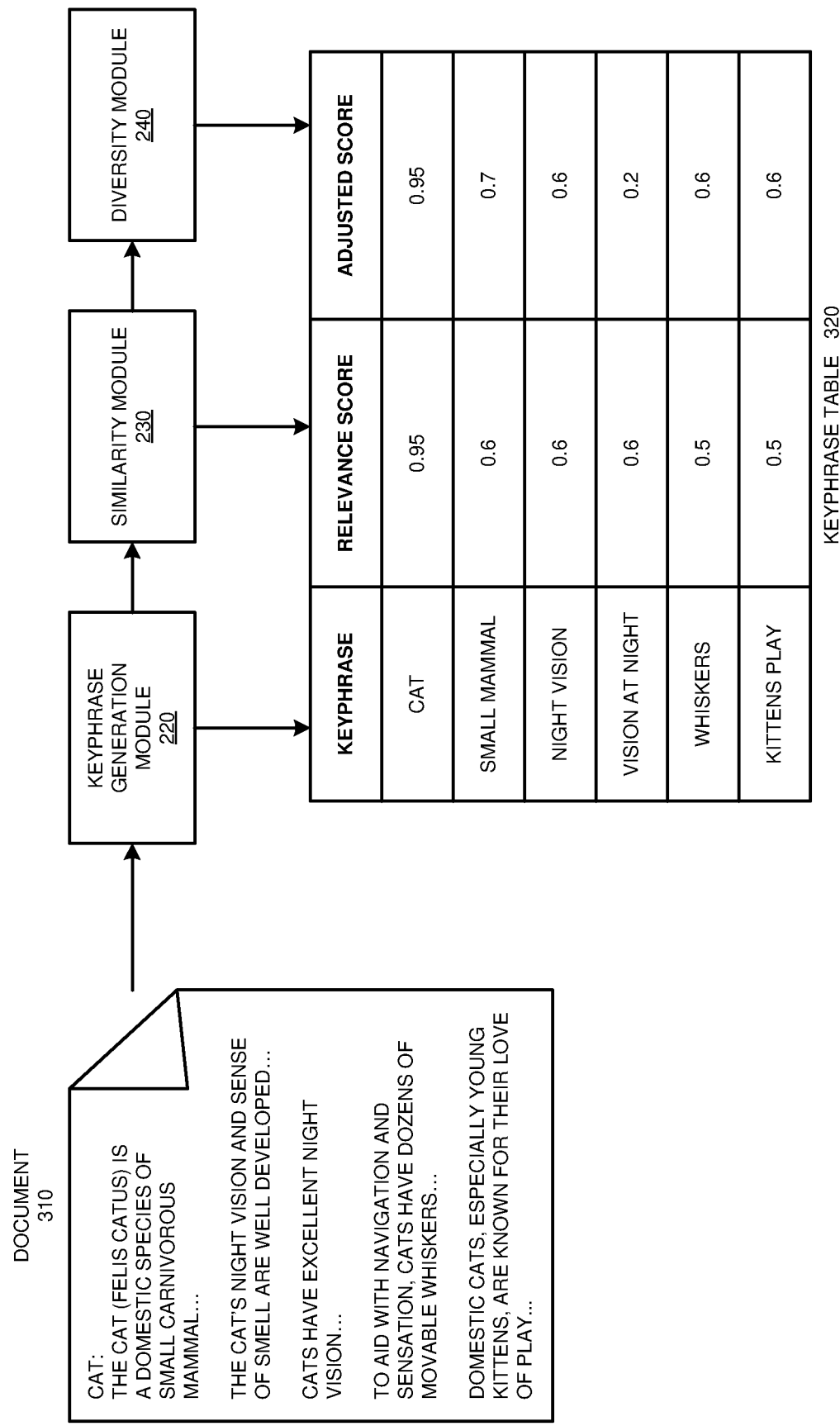
FIG. 3 depicts an example of keyphrase generation in accordance with an illustrative embodiment.

With reference to FIG. 3, this figure depicts an example of keyphrase generation in accordance with an illustrative embodiment. The example can be executed using application 200 in FIG. 2. Keyphrase generation module 220, similarity module 230, and diversity module 240 are the same as keyphrase generation module 220, similarity module 230, and diversity module 240 in FIG. 2

As depicted, keyphrase generation module 220 uses a trained keyphrase generation model to generate a set of keyphrases corresponding to document 310, a document describing cats. The results are depicted in the keyphrase column of keyphrase table 320. Note that FIG. 3 depicts an extremely simplified example.

Similarity module 230 calculates a relevance score for one or more keyphrases in the set of generated keyphrases, measuring a similarity between each keyphrase and document 310. The results are depicted in the relevance score column of keyphrase table 320. For example, the keyphrase "cat" has a similarity score of 0.95 (in a 0-1 scale) to document 310, which describes cats. The remaining keyphrases have lower similarity scores than the keyphrase "cat" because the remaining keyphrases relate to portions of document 310 rather than the entire document.

Diversity module 240 adjusts a relevance score for one or more keyphrases in the set of generated keyphrases, using a diversity balancing function. A diversity balancing function uses diversity among keyphrases to adjust the keyphrases' relevance scores, reducing the number of keyphrases in a set that are very similar to each other (and thus redundant) in favor including some diverse keyphrases. The results are depicted in the adjusted score column of keyphrase table 320. For example, because the keyphrases "night vision" and "vision at night" in table 320 are very similar to each other, the relevance score of one of the keyphrases is adjusted downward so that a selection of the top-scored keyphrases will omit one of the redundant keyphrases.

Figure 4:
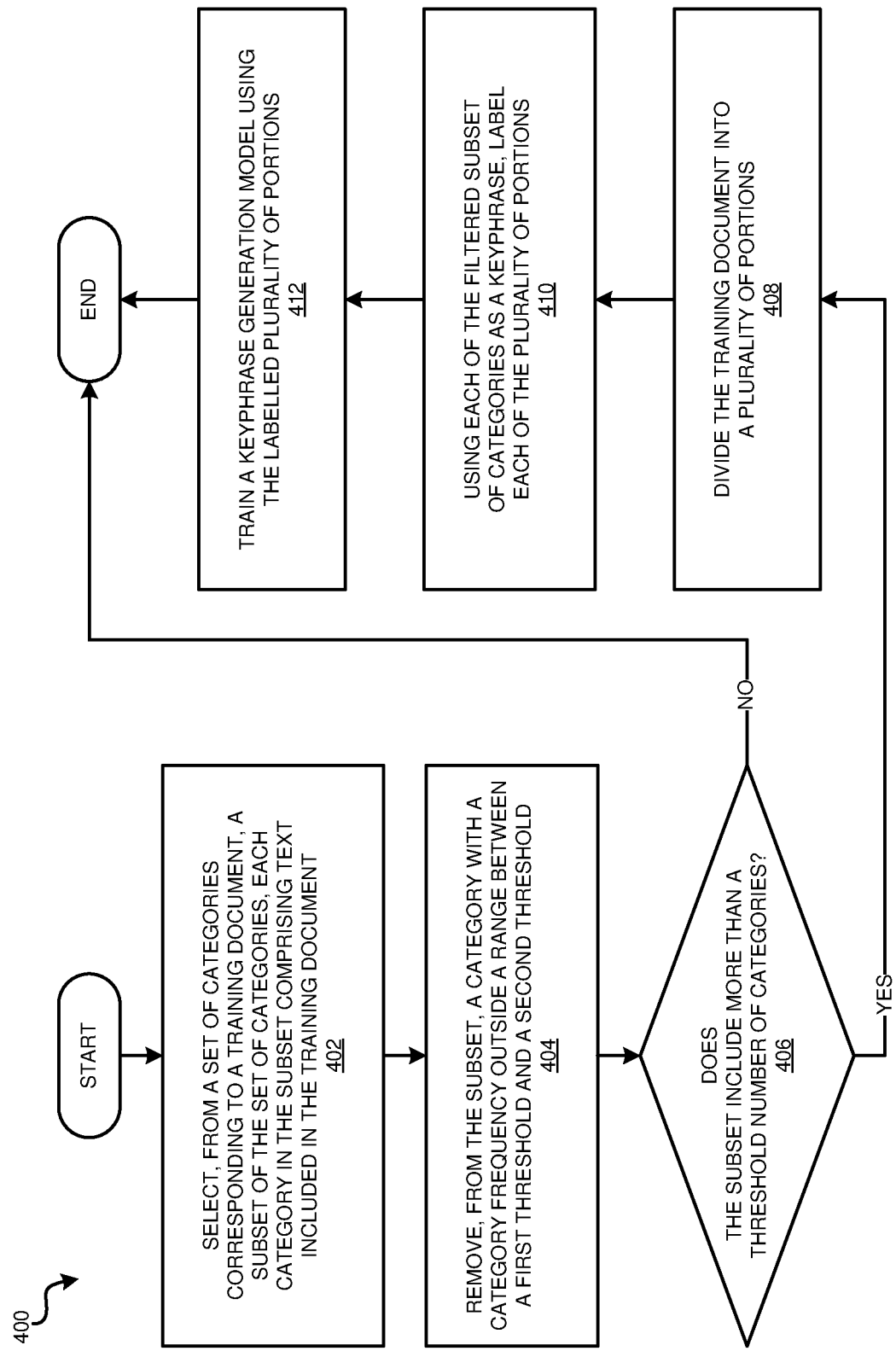
FIG. 4 depicts a flowchart of an example process for keyphrase generation in accordance with an illustrative embodiment.

With reference to FIG. 4, this figure depicts a flowchart of an example process for keyphrase generation in accordance with an illustrative embodiment. Process 400 can be implemented in application 200 in FIG. 2.

In block 402, the application selects, from a set of categories corresponding to a training document, a subset of the set of categories, each category in the subset comprising text included in the training document. In block 404, the application removes, from the subset, a category with a category frequency outside a range between a first threshold and a second threshold. In block 406, the application determines whether the subset includes more than a threshold number of categories. If yes ("YES" path of block 406), in block 408, the application divides the training document into a plurality of portions. In block 410, the application, using each of the filtered subset of categories as a keyphrase, labels each of the plurality of portions. In block 412, the application trains a keyphrase generation model using the labelled plurality of portions. Then (also "NO" path of block 406) the application ends.

Figure 5:
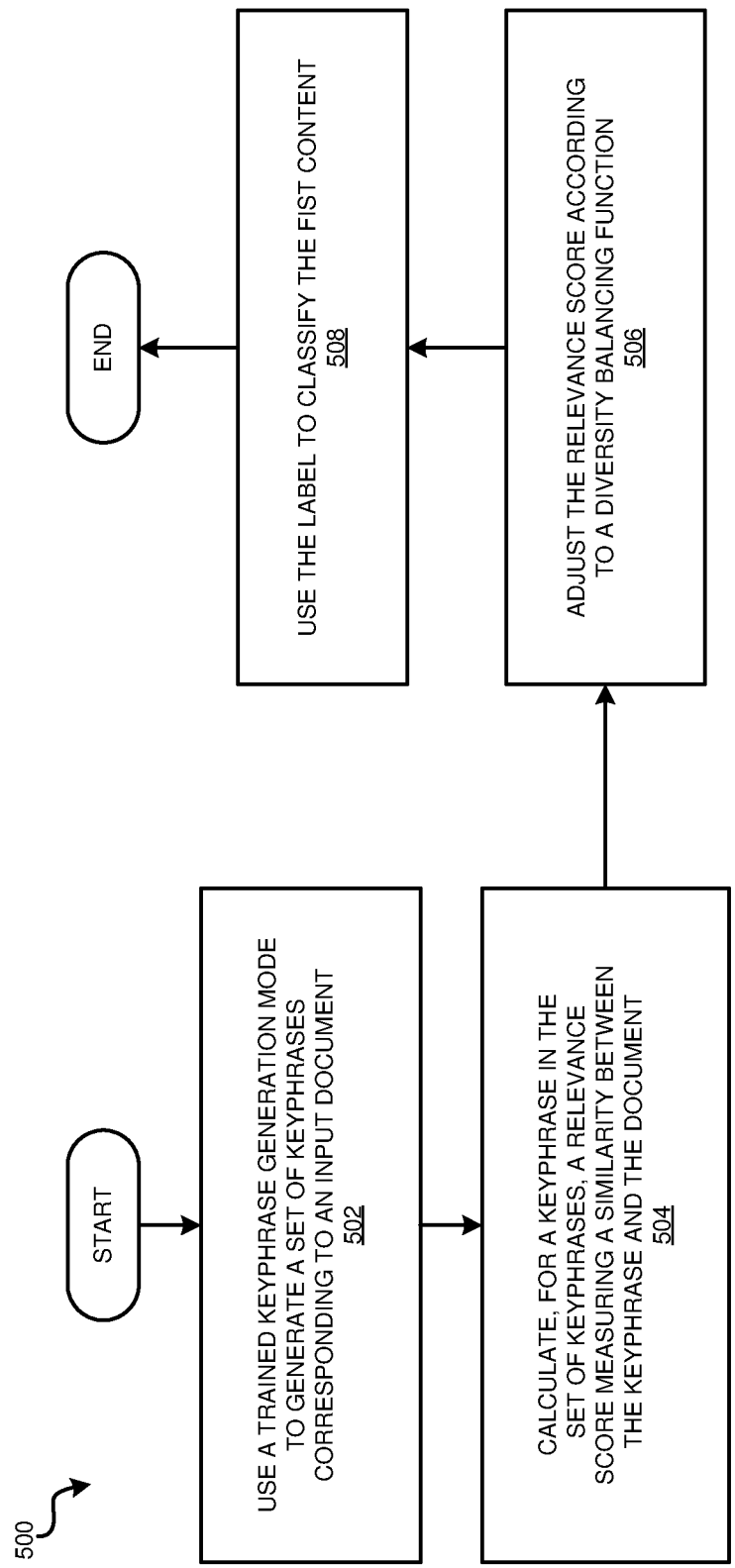
FIG. 5 depicts a flowchart of an example process for keyphrase generation in accordance with an illustrative embodiment.

With reference to FIG. 5, this figure depicts a flowchart of an example process for keyphrase generation in accordance with an illustrative embodiment. Process 500 can be implemented in application 200 in FIG. 2.

In block 502, the application uses a trained keyphrase generation mode to generate a set of keyphrases corresponding to an input document. In block 504, the application calculates, for a keyphrase in the set of keyphrases, a relevance score measuring a similarity between the keyphrase and the document. In block 506, the application adjusts the relevance score according to a diversity balancing function. In block 508, the application uses the label to classify the first content. Then the application ends.

Thus, a computer implemented method, system or apparatus, and computer program product are provided in the illustrative embodiments for keyphrase generation and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    responsive to receiving a sequence of an input document, generating by a neural network, using a trained keyphrase generation model, a set of keyphrases corresponding to the input document, a keyphrase in the set of keyphrases comprising a word summarizing a portion of the input document wherein an encoder of the neural network receives the sequence of the input document and outputs a context and wherein a decoder of the neural network receives the context and outputs the keyphrase in the set of keyphrases;
    calculating, for the keyphrase in the set of keyphrases, a relevance score, the relevance score measuring a similarity between an embedding of the keyphrase in the neural network and an embedding of the input document in the neural network wherein the embedding of the keyphrase and the embedding of the document are generated by a contextual model; and
    adjusting, according to a diversity balancing function, the relevance score, the adjusting resulting in an adjusted relevance score wherein performing the adjusting is further based on the neural network configured with equal weight wherein the neural network receives a vector of a keyphrase-input document pair in tandem with a vector of an entity and textual description of the entity.

2. The computer-implemented method of claim 1, wherein an input to the trained keyphrase generation model comprises a previously generated keyphrase in the set of keyphrases.

3. The computer-implemented method of claim 1, wherein the relevance score comprises a cosine similarity between a numerical representation of the keyphrase and a numerical representation of the document.

4. The computer-implemented method of claim 1, further comprising:
    selecting, from a set of categories corresponding to a training document, a subset of the set of categories, each category in the subset of categories comprising text included in the training document;
    removing, from the subset of categories, a category with a category frequency outside a range between a first threshold and a second threshold, the removing resulting in a filtered subset of categories;
    dividing, responsive to determining that the filtered subset of categories includes more than a third threshold number of categories, the training document into a plurality of portions;
    labelling, using each of the filtered subset of categories as a keyphrase, each of the plurality of portions, the labelling resulting in a labelled plurality of keyphrase model generation training data; and
    training, using the labelled plurality of keyphrase model generation training data, a keyphrase generation model, the training resulting in the trained keyphrase generation model.

5. The computer-implemented method of claim 1, further comprising:
    ranking, according to the adjusted relevance score corresponding to each keyphrase in the set of keyphrases, the set of keyphrases, the ranking resulting in a ranked set of keyphrases; and
    selecting, as an output set of keyphrases corresponding to the input document, a predetermined number of the highest-ranked keyphrases in the ranked set of ranked keyphrases.

6. The computer-implemented method of claim 1, wherein adjusting, according to the diversity balancing function, the relevance score is controlled by a predefined parameter, the predefined parameter implementing a tradeoff between relevance and diversity.

7. The computer-implemented method of claim 1, wherein adjusting, according to the diversity balancing function, the relevance score is performed using a knowledge graph clustering technique wherein the knowledge graph is based on the input document.

8. A computer program product comprising one or more computer readable storage medium, and program instructions collectively stored on the one or more computer readable storage medium, the program instructions executable by a processor to cause the processor to perform operations comprising:

responsive to receiving a sequence of an input document, generating by a neural network, using a trained keyphrase generation model, a set of keyphrases corresponding to the input document, a keyphrase in the set of keyphrases comprising a word summarizing a portion of the input document wherein an encoder of the neural network receives the sequence of the input document and outputs a context and wherein a decoder of the neural network receives the context and outputs the keyphrase in the set of keyphrases;

calculating, for the keyphrase in the set of keyphrases, a relevance score, the relevance score measuring a similarity between an embedding of the keyphrase in the neural network and an embedding of the input document in the neural network wherein the embedding of the keyphrase and the embedding of the document are generated by a contextual model; and adjusting, according to a diversity balancing function, the relevance score, the adjusting resulting in an adjusted relevance score wherein performing the adjusting is further based on the neural network configured with equal weight wherein the neural network receives a vector of a keyphrase-input document pair in tandem with a vector of an entity and textual description of the entity.

9. The computer program product of claim 8, wherein the stored program instructions are stored in a computer readable storage device in a data processing system, and wherein the stored program instructions are transferred over a network from a remote data processing system.

10. The computer program product of claim 8, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:

program instructions to meter use of the program instructions associated with the request; and program instructions to generate an invoice based on the metered use.

11. The computer program product of claim 8, wherein an input to the trained keyphrase generation model comprises a previously generated keyphrase in the set of keyphrases.

12. The computer program product of claim 8, wherein the relevance score comprises a cosine similarity between a numerical representation of the keyphrase and a numerical representation of the document.

13. The computer program product of claim 8, further comprising:

selecting, from a set of categories corresponding to a training document, a subset of the set of categories, each category in the subset of categories comprising text included in the training document;

removing, from the subset of categories, a category with a category frequency outside a range between a first threshold and a second threshold, the removing resulting in a filtered subset of categories;

dividing, responsive to determining that the filtered subset of categories includes more than a third threshold number of categories, the training document into a plurality of portions;

labelling, using each of the filtered subset of categories as a keyphrase, each of the plurality of portions, the labelling resulting in a labelled plurality of keyphrase model generation training data; and training, using the labelled plurality of keyphrase model generation training data, a keyphrase generation model, the training resulting in the trained keyphrase generation model.

14. The computer program product of claim 8, further comprising:

ranking, according to the adjusted relevance score corresponding to each keyphrase in the set of keyphrases, the set of keyphrases, the ranking resulting in a ranked set of keyphrases; and selecting, as an output set of keyphrases corresponding to the input document, a predetermined number of the highest-ranked keyphrases in the ranked set of ranked keyphrases.

15. The computer program product of claim 8, wherein adjusting, according to the diversity balancing function, the relevance score is controlled by a predefined parameter, the predefined parameter implementing a tradeoff between relevance and diversity.

16. The computer program product of claim 8, wherein adjusting, according to the diversity balancing function, the relevance score is performed using a knowledge graph clustering technique wherein the knowledge graph is based on the input document.

17. A computer system comprising a processor and one or more computer readable storage media, and program instructions collectively stored on the one or more computer readable storage media, the program instructions executable by the processor to cause the processor to perform operations comprising:

responsive to receiving a sequence of an input document, generating by a neural network, using a trained keyphrase generation model, a set of keyphrases corresponding to the input document, a keyphrase in the set of keyphrases comprising a word summarizing a portion of the input document wherein an encoder of the neural network receives the sequence of the input document and outputs a context and wherein a decoder of the neural network receives the context and outputs the keyphrase in the set of keyphrases;

calculating, for the keyphrase in the set of keyphrases, a relevance score, the relevance score measuring a similarity between an embedding of the keyphrase in the neural network and an embedding of the input document in the neural network wherein the embedding of the keyphrase and the embedding of the document are generated by a contextual model; and adjusting, according to a diversity balancing function, the relevance score, the adjusting resulting in an adjusted relevance score wherein performing the adjusting is further based on the neural network configured with equal weight wherein the neural network receives a vector of a keyphrase-input document pair in tandem with a vector of an entity and textual description of the entity.

18. The computer system of claim 17, wherein an input to the trained keyphrase generation model comprises a previously generated keyphrase in the set of keyphrases.

19. The computer system of claim 17, wherein the relevance score comprises a cosine similarity between a numerical representation of the keyphrase and a numerical representation of the document.

20. The computer system of claim 17, further comprising:
- selecting, from a set of categories corresponding to a training document, a subset of the set of categories, each category in the subset of categories comprising text included in the training document;
- removing, from the subset of categories, a category with a category frequency outside a range between a first threshold and a second threshold, the removing resulting in a filtered subset of categories;
- dividing, responsive to determining that the filtered subset of categories includes more than a third threshold number of categories, the training document into a plurality of portions;
- labelling, using each of the filtered subset of categories as a keyphrase, each of the plurality of portions, the labelling resulting in a labelled plurality of keyphrase model generation training data; and
- training, using the labelled plurality of keyphrase model generation training data, a keyphrase generation model, the training resulting in the trained keyphrase generation model.

* * * * *